June 24, 1930.  H. V. WELCH  1,768,179
ART OF DISTILLATION
Filed July 22, 1925  2 Sheets-Sheet 1
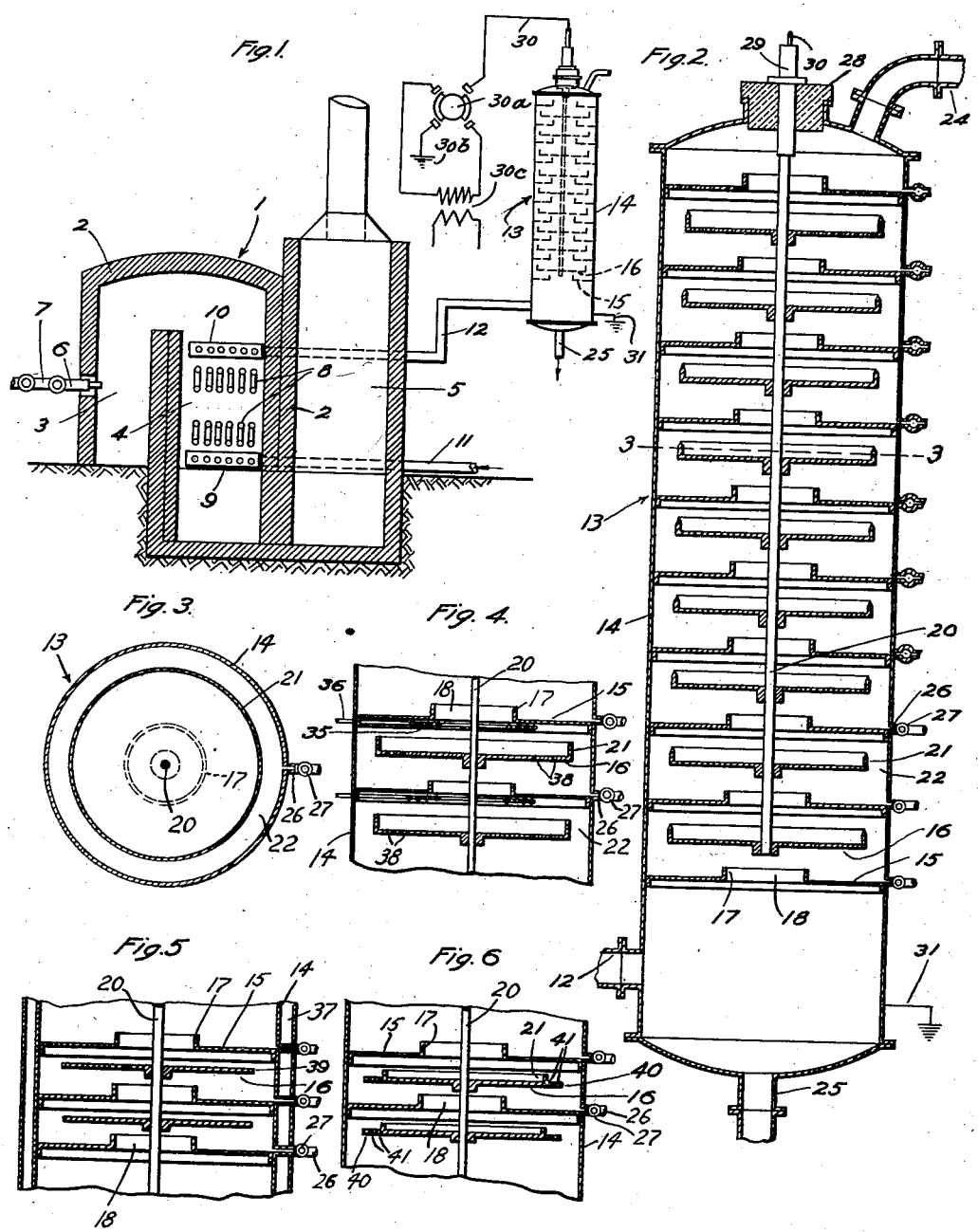
INVENTOR
Harry V. Welch
BY Arthur P. Knight
ATTORNEY

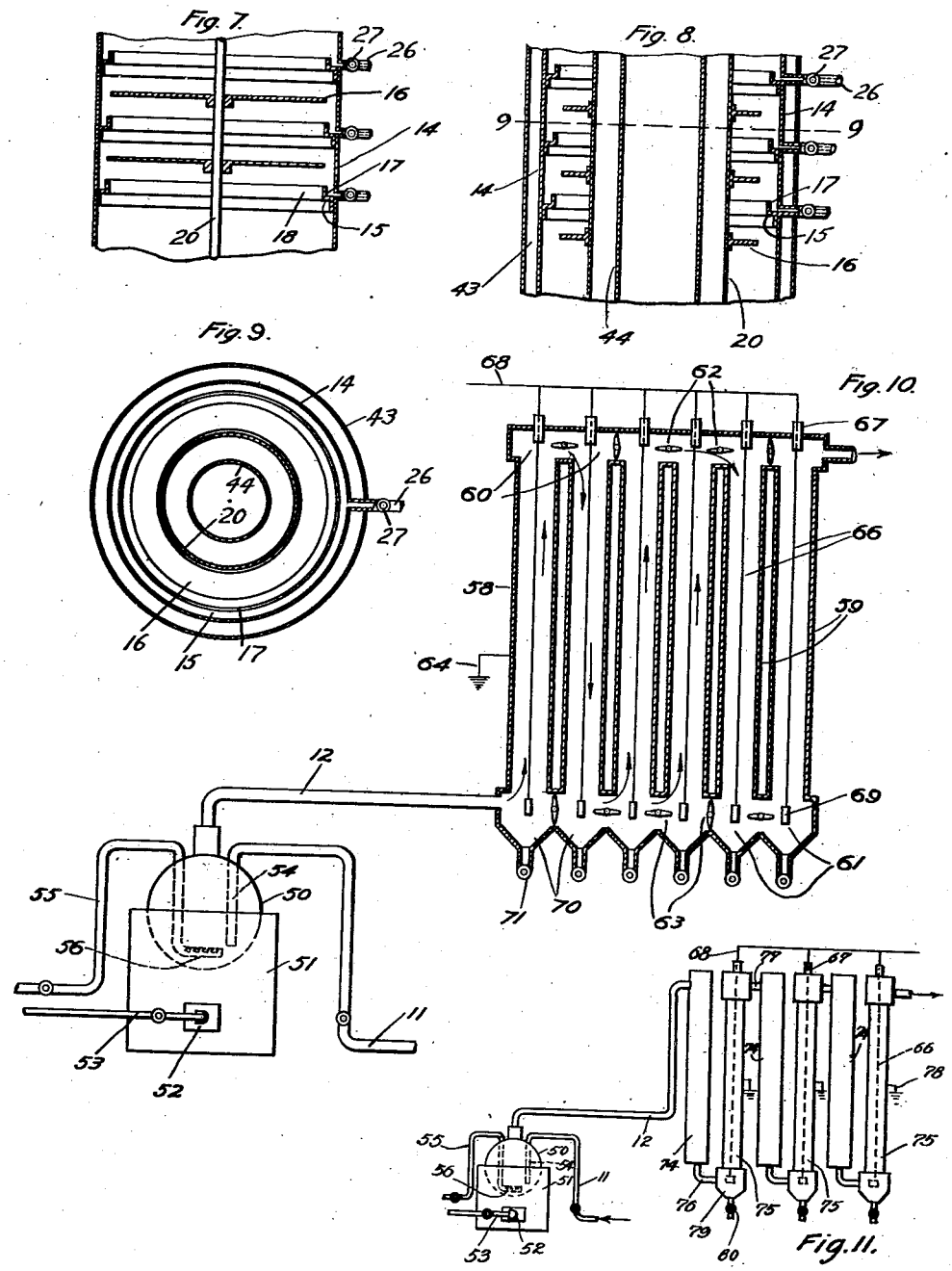

Patented June 24, 1930

1,768,179

UNITED STATES PATENT OFFICE

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

ART OF DISTILLATION

Application filed July 22, 1925. Serial No. 45,197.

This invention relates to the distillation and condensation of liquids containing constituents of different volatility and particularly to the fractional distillation of petroleum or hydrocarbon oils for the purpose of separating such hydrocarbons into fractions of different volatility. In the distillation processes now employed for this purpose it is customary to subject the hydrocarbon oil, either in the form of crude petroleum or a partially refined petroleum product, or other liquid to be distilled, to the action of heat to volatilize some of the constituents thereof, then to remove such resulting vapor from the liquid and to subject the same to cooling, preferably in two or more stages so as to separate or condense therefrom condensates of different volatility. Such condensation may be either of the type known as rectifying condensation in which the vapors are subjected to a reduction of temperature by stages but the liquid condensing out at each stage is not immediately separated but is subjected to redistillation under the influence of heat received in part from the condensation of higher boiling fractions in the preceding stage, thus providing a sharper separation of the various constituents of the vapor, or it may be of the type known as simple condensation, in which the vapors are subjected to cooling resulting in condensation of a portion thereof, and such portion is removed and the vapors then subjected to further cooling to separate another portion, etc. The former type of condensation is usually carried out in what are known as rectifying columns or rectifying condensers, through which the vapors pass upwardly and are continually reduced in temperature, while the condensate formed as the gases are progressively cooled is collected at various levels and is subjected to the heat of the gases which reach such levels and to the latent heat released by condensation of higher boiling fractions in the lower sections of the rectifying column, so as to cause a further evaporation therefrom of constituents which are volatile at that temperature and cause the ultimate reduction of each of the bodies of liquid so collected to a single constituent of the vapors or to constituents having approximately the same boiling points.

In either type of condensation the condensate is usually formed largely or wholly in the form of a mist or a cloud and therefore does not readily separate from the vapor but tends to be carried along therewith thus preventing sharp separation of the various constituents. The disadvantages of such entrainment of condensed particles in the form of a mist are of particular importance in the case of rectifying columns, since greater pains are taken in that case to so design the apparatus as to obtain a very sharp separation of the constituents of the vapor, and the efforts thus expended are often rendered entirely useless due to the entrainment or carrying over of condensed particles of liquid from one stage of the rectifying column to a higher stage. The disadvantages of such entrainment are also particularly noticeable and objectionable in cases in which the vapors entering the condenser contain constituents having a higher boiling point than the product to be obtained and of a particularly objectionable nature, such as tar or tarry or asphaltic material in the case of hydrocarbon oils, which condenses out first and which, if entrained as a cloud or mist, becomes mixed with and contaminates the lighter constituents collected later on. An important object of my invention is to prevent contamination of the more volatile or lighter constituents by the less volatile objectionable constituents. Furthermore, contamination may be caused in some cases, by mechanical entrainment of unvaporized liquid particles from the still in the form of a cloud or mist. Such particles often-times contain materials of much higher boiling point than the desired product, and if allowed to mix with the condensate diminish greatly the value thereof, due to dark color, odor, or other objectionable properties. It is a further object of my invention to prevent such contamination by entrained particles.

My invention consists in the use of electrical precipitation methods for the separation within, before, or between successive stages of condensation of any condensate or entrained liquid formed or present as a mist or cloud within, before or between such stages, thus rendering the separation much sharper and more positive than has heretofore been possible. The invention is particularly applicable and is of the greatest advantage in connection with rectifying condensation but may also be applied in connection with simple condensation, but in either case it brings about the removal from the vapor within each stage, or between each stage and the next succeeding one, of any condensate formed in that stage, and thus prevents the contamination of the more volatile constituents by the presence of less volatile constituents which would otherwise be carried over as above described, and when practiced before the first stage of condensation it also eliminates the contamination of the product by mechanically entrained unvolatilized impurities or by high boiling constituents which condense before actually reaching the condenser.

A further advantage which results particularly from the provision of an electrical precipitating operation during at least a portion of each cooling and condensing operation is that such electrical precipitating operation creates or causes a migration of the gas itself in a direction from the discharge electrode toward the collecting electrode, such phenomenon being termed "electric wind." This causes the gas to be kept continually in circulation, and increases the uniformity with which different parts of the gas are brought into contact with the cooling surfaces and thus still further promotes the sharpness of separation.

The accompanying drawings illustrate embodiments of my invention and referring thereto:

Fig. 1 is a diagrammatic view of a pipe still and a rectifying condenser provided with means for electrical precipitation according to my invention.

Fig. 2 is a vertical section of the rectifying condenser shown in Fig. 1.

Fig. 3 is a horizontal section on line 3—3 in Fig. 2.

Figs. 4, 5, 6, 7, and 8 are partial vertical sections of modified forms of condensers.

Fig. 9 is a horizontal section on line 9—9 in Fig. 8.

Fig. 10 is a diagrammatic view of a steam still provided with condensing means according to my invention.

Fig. 11 is a diagrammatic view of another modified form of condensing means as applied in connection with a steam still.

In Fig. 1 I have shown at 1 a pipe still which may be of any suitable type. Such still is here shown as comprising a housing 2 of brick or other refractory material and constituting a combustion chamber or fire box 3, heating or pipe chamber 4, and a flue 5. Burner means 6 are provided in the combustion chamber, having suitable fuel supply means 7. Within heating chamber 4 are provided a plurality of heating coils or pipes 8 passing continuously through such chamber and connected at the bottom and top to headers 9 and 10 respectively. Supply means 11 are connected to header 9 for supplying thereto the crude petroleum or other oil to be distilled, and vapor pipe 12 leads from the upper header 10 to the lower portion of rectifying column 13.

Said rectifying column comprises, as more clearly shown in Figs. 2 and 3, an outer cylindrical shell or casing 14 and a plurality of alternating trays or pans 15 and 16 within said casing, the trays 15 being mounted upon the cylindrical casing 14 and having an upturned flange or lip 17 surrounding and defining a central opening 18, and each of the pans 16 being mounted upon a central rod or other supporting means 20 and having an upturned flange or lip 21 at its outer edge, thus providing an annular opening 22 between said flange and the outer casing. The vapor entering through pipe 12 at the bottom of the column is thus caused to follow a tortuous path upwardly therethrough due to the alternate arrangement of the trays 15 and 16, and suitable exit means such as pipe 24 are connected to the upper end of the column to carry away therefrom the uncondensed portions of the vapor. Suitable drain means such as pipe 25 may be provided at the bottom of the column for continually or intermittently drawing off unvolatilized liquid carried over through vapor line 12, such unvaporized liquid being discharged or being advantageously returned to the supply line 11 leading to the still as is customary in such processes. Suitable drain means are also provided for each of the trays 15, such drain means comprising for example pipes 26 provided with valves 27.

My invention may comprise in connection with a rectifying column as above described, or any other suitable type of rectifying column, means for producing an electrical discharge at certain portions of the column through which the vapors pass so as to remove from such vapors at such portions or zones any suspended liquid particles carried thereby. For this purpose I prefer to insulate the central supporting rod 20 together with the trays 16 carried thereby from the outer casing 14 and the trays 15, for example by means of an insulating plug or bushing 28 at the upper end of the casing and adapted to support said supporting rod 20 in central position within the casing as well as to electrically insulate the same therefrom. The supporting rod 20 is provided with a portion 29 projecting through the insulating means 28 and connected to suitable means for supplying high tension electrical current thereto, for example wire 30. The cylindrical casing 14 is grounded in any suitable manner either by connection of a grounded wire thereto or simply by grounding a metallic portion of such casing as indicated at 31. Any suitable means may be used for supplying the necessary potential difference between the portions of the apparatus connected to supporting rod 20 and the casing 14 and parts connected thereto. For example the wire 30 connected to rod 20 may lead to one side of a source of high tension current, either alternating or direct, but preferably rectified alternating current, the other side of which source is grounded. Said source of high tension current may be adapted to maintain any desired potential between the discharge system and the collecting system, for example 15,000 to 100,000 volts. I have shown in Fig. 1, for example, the wire 30 connected to a mechanical rectifier 30ª, having a ground connection 30ᵇ and connections to the secondary winding of a step-up transformer 30ᶜ whose primary winding is connected to any suitable alternating current supply circuit. In case alternating current discharge is to be used, the rectifier would of course be omitted, and wire 30 connected directly to one side of the transformer secondary, the other side of which would be grounded.

In the form of the invention shown in Fig. 2 the primary cooling of the vapors is accomplished wholly by the cooling of the outside walls 14 by the surrounding air, although as will be hereinafter described local condensation may occur in the vapors striking the bottom of each of the pans or trays 15 and 16 due to the fact that the condensate collected in such pans is in each case of somewhat lower temperature than such vapors. As indicated in Fig. 4 however additional cooling means may be provided such as pipes or coils 35 located beneath each of the pans or trays 15 and connected by means of inlet pipes 36 and outlet pipes not shown for circulation of cooling water therethrough. Or, as shown in Fig. 5, the walls 14 of the condenser may be cooled by means of a water jacket 37 surrounding the outer casing and provided with means for circulating cooling water or, if desired, other cooling medium therethrough.

Modifications may also be made in the shape, construction, or arrangement of the trays 15 and 16 of the rectifying column. For example as shown in Fig. 4 the inner trays 16 may be provided with holes or perforations 38 in the bottom so that the liquid condensing therein may fall through such holes onto the tray 15 beneath instead of being required to pass over the edges of the flanges 21 as in the form shown in Fig. 2. Or as shown in Fig. 5 the flanges 21 may be omitted and the trays 16 may consist simply of flat discs, the liquid condensing thereon in this case simply passing over the edges 39 of such discs. In some cases however it may be preferable to provide for collection of a body of liquid of considerable depth in the trays 16 as is provided for in the form shown in Fig. 2, but at the same time prevent the liquid in dropping from such trays onto the trays 15 from passing over the edge portions of the trays 16 and flanges 21 from which the electrical discharge takes place. For example, as shown in Fig. 6 trays 16 may be provided with portions 40 projecting outwardly beyond the upturned flanges 21 and having perforations or holes 41 therein for passage of liquid. In this case the liquid collects and runs over the top of flange and through holes 41, leaving the outer edges of portions 40 free from liquid so as to facilitate electrical discharge therefrom.

In other cases I may prefer to form the inner trays 16 as flat discs, and the outer trays 15 as relatively narrow annular troughs, whose upturned flanges 17 are close to the cylindrical casing 14 and provide a large central opening or passage 18 therethrough, as shown in Fig. 7. A somewhat similar construction is shown in Figs. 8 and 9, in which the supporting means 20 consists however of a cylindrical tube or casing instead of a rod, the trays 16 consisting in this case of horizontal ribs extending around said inner casing 20 and projecting therefrom. Cooling means such as water jacket 43 may be provided surrounding the outer casing 14 and additional cooling means such as water jacket 44 may also be provided within the inner supporting casing 20. In this case the supporting casing 20 and the ribs or trays 16 carried thereby are insulated from the outer casing so as to constitute the high potential discharge electrode system of the apparatus. In the two latter forms of condensing column there is less opportunity for rectification, due to the inability of the trays 15 and 16 to retain very considerable quantities of liquid in the column for the purpose of re-volatilization of constituents, and these columns are therefore better adapted for simple fractional condensation, rather than rectifying condensation.

In the operation of the apparatus above described, using any of the above types of construction of rectifying column, the oil or other liquid to be subjected to distillation is introduced to heating coils or pipes 8 through pipe 11 and is heated in said coils by the hot combustion gases from burner 6, said combustion gases passing from fire box 3 through heating chamber 4 and thence out through flue 5. In passing through the heating coils 8 the oil is raised to a sufficient temperature to volatilize certain portions thereof and the vapors thus produced are carried together with unvolatilized oil through pipe 12 to the bottom of the condenser 13. The process may be so carried out that there will be a reduction of pressure at the point of entrance into the lower end of the condenser column, resulting in further volatilization at this point, or there may be substantially no reduction of pressure occurring here so that there will be no additional release of vapors at this point. In any event the volatilized portions of the oil, including those released upon issuing from pipe 12 if any, pass upwardly through the rectifying column and between the alternate trays 15 and 16 thereof while the residual unvolatilized oil passes out through pipe 25 and is either discharged or returned to supply pipe 11 with the incoming oil.

The hot vapors in passing upwardly through the column are gradually reduced in temperature and successive portions thereof of increasing volatility are thus condensed to the form of a liquid. In the usual type of rectifying column a portion of the liquid thus condensed at each level of the column falls into the trays 15 and 16 or other means provided for this purpose and drains down the walls 14 of the casing into the trays 15, and in these trays such liquid is subjected to a certain amount of redistillation due to the heat of the vapors passing the underside of the trays. A certain amount of the more volatile portions of the condensed liquid are thus revolatilized and a more complete separation of the various constituents is obtained which is commonly known as rectification. This revolatilization of the more volatile constituents of the liquid condensed in each tray also occurs in the present instance. In the ordinary type of rectifying column however a considerable portion of the condensate formed at each level of the column is produced in the form of a mist or cloud of particles of such small size that they do not readily settle out and are thereby entrained with the vapors to a higher level in the column before separation. This results in the contamination of the lower boiling point constituents collected in the upper part of the column by considerable proportions of higher boiling constituents which were actually condensed at a lower stage but were not separated until reaching a higher stage. An important object of my invention is to prevent such contamination and this is accomplished by setting up an electrical field at certain portions of the rectifying column, said electrical field being sufficient to effect agglomeration and electrical precipitation of the condensate appearing in the form of a mist so that the vapors are continually maintained clean and free from entrained mist. The high tension system being energized as before described, an electrical field will be set up between the edges of the trays 16 or the up-turned rims 21 thereof and the outer wall 14 or the under side of the trays 15. The electric discharge is in either case directed toward a cooling surface, that is, either toward wall 14 or the underside of one of the trays 15. The vapors are thus subjected to the action of an electrical field in passing through the zone above each tray 15 to the zone above the next tray 15 so that any condensate formed in the zone above one of such trays even though it be formed as a mist or cloud is precipitated and collected in such tray, and only the clean vapor free from suspended liquid particles is permitted to pass into the zone above the next tray 15. A portion of the liquid is also collected in the trays 16 and subjected to redistillation, a portion of such collected liquid again passing off as vapor and the remaining portion continually discharging over the edges of such trays or through the holes in the bottom thereof onto the trays 15 just below. A very sharp separation of the constituents or vapors is thus obtained and the liquid condensing and collecting in each tray 15 will have a very short boiling range and will be substantially free from contamination by constituents of higher boiling points. The condensates thus collected in each tray 15 may be drawn off continually through the outlets 26 and may each be collected separately or two or more adjacent outlets 26 may be connected together to provide for mixing of the condensates from several successive stages of the column.

In addition to the precipitating action the electrical field also creates an electric wind, or a movement of the vapors themselves toward the collecting electrode surfaces and hence brings such vapors into more effective contact with the cooling surfaces and causes more uniform cooling thereof. Substantially all vapors passing through each cooling stage are therefore reduced to a very uniform temperature and the sharpness of separation is still further increased.

The invention provides not only for the immediate separation of condensed particles and consequent sharp separation, but also for the removal of mechanically entrained liquid particles. It will be seen that any unvaporized liquid particles carried along as a spray or mist by the vapors from the bottom of the column will be precipitated, together with the first portion of condensate, by the electrical field above the lowermost tray 15, and will thus be prevented from reaching the upper sections of the column and contaminating the products. If the liquid collected on the lowermost tray or trays 15 is found to be contaminated with precipitated entrained material it may be run back into the still feed pipe for re-distillation.

As shown in Fig. 10 my invention may also be applied in connection with simple condensation, that is to say to a type of condensation in which the condensed liquid is not subjected to revolatilization but is removed from the system directly after condensation. In this case I have shown my invention as applied in connection with a type of still known as a steam still but it will be understood that the type of condensing apparatus shown in this form of the invention may also be applied in connection with any other still such as a pipe still of the type shown in Fig. 1 and also that the type of rectifying condenser above described may be applied in connection with a steam still as well as with a pipe still. The still shown in Fig. 10 comprises a cylindrical shell or casing 50 disposed horizontally and mounted upon a brick setting 51, and burner means 52 provided with fuel supply means 53 for applying heat to the underside of such casing. Oil supply means 11 are provided for introducing to the still 50 the oil to be distilled, said supply means having a downwardly extending portion 54 extending beneath the normal level of the oil within the still, it being understood that supply means 11 are also provided with suitable means for introducing the oil thereto at a suitable pressure. Steam supply means 55 are also provided for introducing steam to heat the oil in the still 50 and said steam supply means are preferably provided with perforated coils 56 through which the steam issues into the oil and thus serves not only to aid in heating the oil but also to both agitate the same and facilitate the liberation of volatile constituents therefrom. From the top of still casing 50 vapor line 12 leads to the condenser indicated at 58.

Said condenser 58 comprises a plurality of vertically extending flues, pipes or casings 59 communicating at their upper ends with passage means 60 and at their lower ends with passage means 61, and suitable valve or damper means are provided for controlling the direction of passage of the vapor through the respective vertical flues 59. Such damper means may comprise dampers 62 located between the adjacent upper passage means 60 and dampers 63 located between the adjacent lower passage means 61. Such dampers may be so operated as to cause the vapor to follow a zig-zag course through the condenser, first passing upwardly and then downwardly, etc., through the successive vertical flues 59. As indicated however the position of the dampers 62 and 63 may be so regulated as to bring two or more of the adjacent flues 59 into parallel flow arrangement with one another at any desired point in the condenser so as to provide for a slower flow of the vapors at such point. The vertical flues or casings 59 are grounded as indicated at 64 and constitute collecting electrodes for the electrical precipitation system. Suitable discharge electrode means are also provided comprising, for example discharge wires 66 suspended vertically and centrally within the flues 59 and passing through suitable insulating and supporting means 67 at the top of the condenser and being connected for example by wire 68 to suitable means for supplying high tension electric current thereto. The discharge wires 66 may be provided with suitable weights 69 at their lower ends for tensioning the same and causing them to hang in proper position. Suitable liquid collecting or receiving means 70 are provided at the bottom of each vertical flue 59 and outlet or drain means 71 are provided for carrying off the liquid collected in each of such receiving means.

In the operation of this form of the invention the oil to be distilled is supplied through pipe 11 to still casing 50 and is heated therein by means of a fire maintained at burner means 52, and also by means of steam introduced through supply means 55 and coil 56. The volatilized portions of the oil, together with steam pass over through vapor pipe 12 into condenser 58 and pass through such condenser in the manner indicated by the arrows. In passing through the successive tubes or pipes 59 of the condenser the vapors are cooled in successive stages by means of the cooler air surrounding the condenser tubes or if desired by means of suitable cooling coil or cooling jacket means with which such condenser tubes may be provided, and portions of successively lower boiling point are thus condensed in the successive pipes 59. The electrical field maintained within each of said pipes 59 by means of the high tension discharge members 66 serves to precipitate onto the walls of such pipes any liquid condensed therein in the form of a mist or cloud and thus prevents entrainment of such condensed liquid into the next succeeding stage of the condenser. In this case also as well as in the form first described a much sharper separation of the constituents of differrent boiling points is thus effected than would otherwise be possible, and particularly the contamination of the lower boiling portions by entrained quantities of higher boiling constituents is prevented. The liquid condensed is precipitated in each of the vertical pipes 59 and collected in the respective receiving means 70 at the bottom thereof and may be drained off either continually or intermittently through outlet means 71 to be collected for any suitable purpose. Some of the steam may condense to form water at certain stages of the condensation, and such water will collect together with the condensed hydrocarbon in the receiving means 70, but may be readily separated therefrom by allowing it to stand and settle out by gravity. It will be observed that in this form of the invention the electrical precipitation occurs simultaneously with the condensation so that any condensed liquid is removed from the vapor stream practically as soon as formed and the vapors are thus continually maintained free from suspended liquid particles. Any suitable means may be provided for cooling the successive stages of the condenser, or the same may be insulated at any desired part so as to produce the desired rate of cooling. Any liquid particles mechanically entrained from the still by the steam and vapors will as before be precipitated in the first stage of the condenser, and if necessary the condensate from this stage may be redistilled, or treated in any suitable manner separately from the later portions, which are free from such entrained impurities. If desired, an electrical precipitating action may be provided in any case before the first stage of condensation, so as to provide for effective separation of liquid carried over from the still without contamination of any of the condensate thereby. This may be accommplished, for example, by thoroughly insulating the first vertical pipe 59, so as to permit the same to act as an electrical precipitator without condensation therein, in which case only mechanically entrained liquid particles will be condensed therein.

The electrical precipitation need not in all cases be carried out simultaneously with the condensation as above described but may in some cases advantageously occur between successive stages of the cooling and condensation, for example, the apparatus shown in Fig. 11 is adapted to carry out my invention in this manner. The still shown in this figure is of the same type and comprises the same elements as that shown in Fig. 10. The vapor line 12 however leads first to one of a plurality of condensers comprising for example vertical tubes or casings 74, adapted to be air-cooled or provided with any suitable cooling means, and a plurality of electrical precipitation units comprising for example vertical tubes or casings 75 are connected in series and alternately with such condensers by means of connecting pipes 76 and 77. With the arrangement shown the vapors pass downwardly through the condensing elements 74 and upwardly through the succeeding precipitating elements 75 but such direction of flow is not essential and in some cases I may prefer to reverse the connections so as to cause the vapors to flow upwardly through the condensing elements and downwardly through the precipitating elements. The outer walls of the casings or precipitating elements 75 are grounded as indicated at 78 and suitable discharge electrode means are provided for such precipitating elements comprising for example vertical wires 66 mounted and provided with means for energization thereof as above described in connection with Fig. 10. Suitable receiving means 79 and outlet means 80 are provided at the bottom of each of the precipitating units 75 and the connecting pipes 76 leading from the condensers 74 to the precipitators 75 may be adapted as shown to carry any collected condensate from each of the condensers 74 into the receiving means 79 for the succeeding precipitating unit. If desired however each of the condensers 74 may be provided with a separate receiving means at its lower end so that the liquid separating out within the condenser will be collected separately from that precipitated in the succeeding precipitator.

In the operation of this form of the invention the vapors passing off from still casing 50 through pipe 12 pass through the successive condensers and precipitators and are gradually reduced in temperature resulting in the successive condensation in the respective condensers of portions of successively lower boiling points. A portion of the liquid is condensed in each of the condensers and separates out and drains to the bottom of the condenser and hence into receiving means 79 but a further portion of such condensed liquid remains in the form of a cloud or mist and is not separated from the gas stream until it enters the succeeding electrical precipitator 75. Here such cloud or mist is precipitated onto the walls of such precipitator and flows down and into the receiving means 79, so that the vapors passing from each of the precipitators into the succeeding condensers are clean and free from entrained liquid particles thus producing as before the desired sharpness of separation of the vapors into constituents of different boiling points.

When carrying out my invention in the last-described apparatus, it will be evident that if the walls of the precipitation elements 75 are not protected against loss of heat, there will be some cooling of the vapors and consequently some condensation within such elements and simultaneously with the precipitating operation, and in some cases I may prefer to operate in this manner or may even provide additional cooling means for the precipitators, so that part of the condensation takes place during the electrical precipitation and part between successive stages of precipitation. In other cases, however, I may prefer to cover the precipitation tubes or pipes 75 with suitable heat insulating material, so that substantially no cooling occurs during precipitation, and in this case the vapors are subjected first to cooling and condensation, then electrical precipitation, then further cooling, etc., and a very sharp separation may thus be effected.

Any of the forms of the invention above described are particularly applicable in connection with distillation processes in which the vapors produced in the still contain constituents of higher boiling point than the desired product, such as asphaltic constituents, or tar, or tarry materials either in the form of vapor or entrained liquid particles. In such cases these tarry materials, if present as a vapor condense first, and in any case are collected in the first or first few stages of the condensation, and by means of the electrical precipitation occurring either simultaneously with the condensation or between successive stages thereof any portions of such tarry materials present or condensing in the form of a mist or cloud are precipitated out of the vapor stream and collected in or immediately following the stage in which they are condensed. In this manner such tarry materials are prevented from being entrained and contaminating the lighter and more volatile constituents condensed in the later stages of the condensation.

While I have described my invention in connection with certain types of stills it will be apparent that it may be applied with equal advantage to the rectifying or fractional condensation of vapors coming from any type of still. For example it may be used in the condensation of the vapors resulting from spray distillation, that is to say from a process in which the liquid to be distilled, such as hydrocarbon oil, is introduced in the form of a fine spray into a current of hot steam or other inert gas, whereby portions of the liquid are vaporized and are carried off with such inert gas and are subsequently condensed therefrom. In this type of distillation as well as in the type of steam distillation described above in which steam in blown or forced through a body of heated oil or other liquid, the action of the stream of hot inert gas has a strong tendency to entrain fine particles of unvaporized liquid in the form of a mist and the feature of my invention which relates to the precipitation of mechanically entrained particles of unvaporized liquid prior to condensation is of great advantage in this connection. Furthermore the presence of inert gases causes a much greater volume flow through the condenser than would be the case if no gas other than the vapors to be condensed were present and consequently increases the tendency to entrain condensate in the form of mist from one stage to the next and I therefore find it of great advantage in connection with such type of distillation to employ electrical precipitation to ensure removal within or immediately following each stage of any condensate formed as a mist within such stage.

The distillation of hydrocarbon oils has been referred to above as a particular example of the application of my process but it should be understood that it is applicable to the distillation of any liquid containing constituents of different volatilities, and is of especial advantage in connection with the rectifying condensation of the vapors resulting from any such distillation process, with a view to obtaining the highest degree of separation between such constituents of different volatilities. It may be applied for example in connection with the distillation of benzol, tar, or of various organic oils, esters, alcohols, etc. It may also be applied in connection with the recovery of condensible constituents of varying volatilities in gas manufacturing processes or in carbonizing coal retorts, and to the recovery of condensible constituents produced in oil shale distillation.

It will be understood that my improved method of distillation and condensation, as applied in any of the above described manners or for any of the above purposes, may be carried out under any suitable conditions of pressure or vacuum, either during distillation, or during condensation or both.

What I claim:

1. An apparatus for separating constituents of different volatilities from vapors containing the same comprising, a condenser provided with successively arranged means for cooling vapor passing therethrough in stages and with means for separately collecting liquids condensed due to such successive cooling stages and for maintaining in the condenser a body of liquid so collected in each stage so as to cause said liquid to be heated by the vapors therein, means for introducing vapors to said condenser, and means for subjecting vapors passing through such condenser to electrical precipitating operations at portions thereof adjacent the respective cooling means to separate therefrom suspended particles of condensed material.

2. An apparatus for condensation of vapors of varying volatilities comprising a rectifying column provided with means for directing vapors upwardly therethrough, means defining a plurality of vertically superposed condensing chambers in said column through which such vapors are caused to pass successively, means for cooling the vapors in successive condensing chambers to successively lower temperatures, means in said column for separately collecting the condensate formed in each condensing chamber and maintaining a body of each such condensate in the column so as to be heated by the vapors therein, and means for maintaining of a high potential electrical discharge directed through the vapors toward said cooling means in each condensing chamber.

3. An apparatus for separating constituents of different volatility from vapors, comprising a casing, means for introducing vapors to be treated at one end of said casing, a series of baffles projecting inwardly from the wall of said casing, another series of baffles within said casing and insulated therefrom, said two series of baffles being disposed alternately so as to cause said vapors to follow a tortuous path through said casing, said first-named baffles and the wall of said casing constituting cooling surfaces, and said other series of baffles being provided with discharge electrode means adapted to produce electric discharge directed toward said cooling surfaces, and means for removing liquid collecting upon said first-named baffles.

4. An apparatus for separating constituents of different volatility from vapors, comprising a casing, means for introducing vapors to be treated at one end of said casing, a series of baffles projecting inwardly from the wall of said casing and having means for holding collected liquid therefrom, the wall of said casing and the under sides of said baffles constituting cooling surfaces, means for removing collected liquid from said baffles, means within said casing having members so formed as to cooperate with said baffles to cause the vapors to follow a tortuous path through said casing and to repeatedly bring such vapors in contact with said cooling surfaces, and means for causing electric discharge from said means.

In testimony whereof I have hereunto subscribed my name this 13th day of July, 1925.

HARRY V. WELCH.